United States Patent

[11] 3,627,031

[72] Inventor Chester D. Ware
     La Crosse, Wis.
[21] Appl. No. 869,835
[22] Filed Oct. 27, 1969
[45] Patented Dec. 14, 1971
[73] Assignee The Trane Company
     La Crosse, Wis.

[54] AIR-CONDITIONING SYSTEM
     4 Claims, 1 Drawing Fig.
[52] U.S. Cl. .................................... 165/22,
     165/29, 165/48
[51] Int. Cl. ........................................ F24f 3/10
[50] Field of Search .......................... 165/22, 50,
     48, 26, 27, 140, 141, 145

[56] References Cited
     UNITED STATES PATENTS
     1,935,281  11/1933  Reed .................. 165/50

*Primary Examiner*—Charles Sukalo
*Attorneys*—Arthur O. Andersen, Carl M. Lewis and Malcolm L. Moore ABSTRACT: An outdoor hydronic heating-cooling unit provides hot and chilled liquid to an indoor fan coil unit. The outdoor unit has a compression cycle refrigeration system for cooling a liquid heat exchange fluid. The outdoor unit also includes a liquid heater with gas burner. A single pump is used to circulate heat exchange liquid between the indoor fan coil unit and the outdoor heating and cooling unit. The liquid heater is arranged above the liquid chiller within a single enclosure.

Patented Dec. 14, 1971
3,627,031
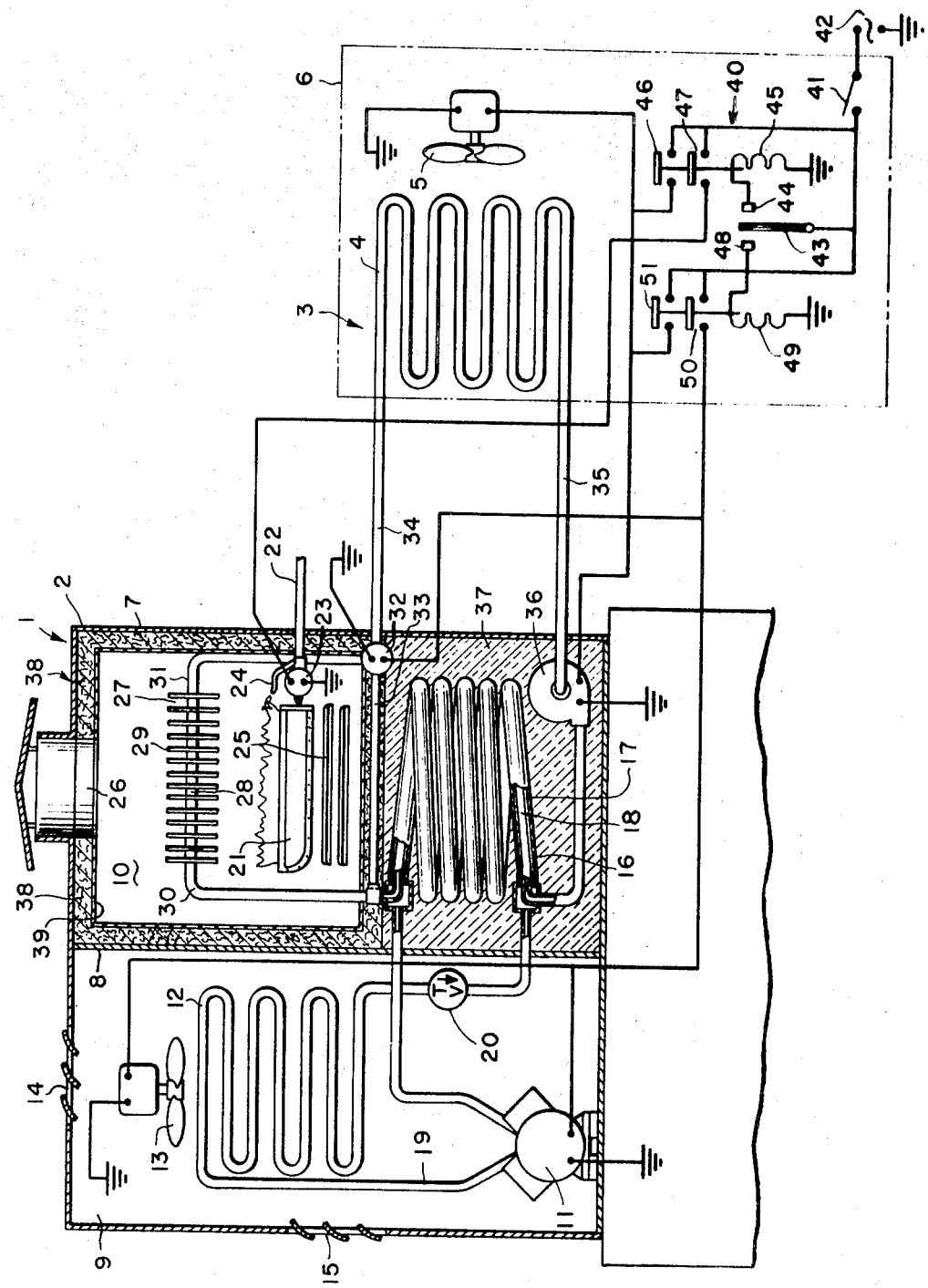
INVENTOR.
CHESTER D. WARE

AIR-CONDITIONING SYSTEM

SUMMARY OF THE INVENTION

This invention relates to air-conditioning systems particularly of the type wherein water or other liquid fluid is used as a heat exchange medium for conducting heat between an outdoor heating and cooling unit and an indoor heat exchanger or fan coil unit.

It is an object of this invention to provide a low-cost, hydronic heating-cooling split system which permits all but the indoor fan coil unit to be located external to the living or conditioned space.

A further object of this invention is to provide a unique liquid heater and chiller combination for supplying hot and chilled water to a fan coil unit within the conditioned space.

And still a further object of this invention is to provide within the combined heater and chiller unit, a unique arrangement of liquid chiller and heater specifically insulated for their respective purposes.

More specifically, this invention involves a heating and cooling air-conditioning system comprising: an indoor heat exchanger arranged in heat exchange relationship with a conditioned space; combined heating and cooling means for supplying said indoor heat exchanger with a heating and cooling heat exchange liquid; first conduit means for conducting a heat exchange liquid from said heating and cooling means to said indoor heat exchanger; second conduit means for returning the heat exchange liquid to said heating and cooling means from said indoor heat exchanger; said heating and cooling means including a housing defining a chamber therein; a liquid chiller within said chamber; a liquid heater within said chamber; means for conducting the heat exchange liquid from said liquid chiller and heater to said first conduit means; means for conducting the heat exchange liquid from said second conduit means to said liquid chiller and heater; and pump means for circulating the heat exchange liquid between said indoor heat exchanger and said heating and cooling means.

DESCRIPTION OF THE DRAWING

The sole FIGURE of the drawing schematically illustrates the hydronic heating-cooling split system which embodies the instant invention.

DETAILED DESCRIPTION

A hydronic heating-cooling split system 1 has an outdoor heating and cooling unit 2 and an indoor fan coil unit 3. Indoor fan coil unit 3 has a heat exchanger 4 and a fan 5 arranged to pass air within the conditioned space 6 in heat exchange relationship with heat exchanger 4 for purposes of heating or cooling the air within conditioned space 6. Outdoor heating and cooling unit 2 which is located external to the conditioned space 6 and preferably remote from the building containing space 6 has an external housing 7 with an internal vertical partition 8 dividing the space within housing 7 into first and second juxtaposed chambers 9 and 10 respectively.

Disposed within first chamber 9 is a refrigerant compressor 11, a refrigerant condenser 12, and a condenser fan 13 arranged to pass outdoor cooling air in heat exchange relationship with condenser 12. To this end housing 7 may be provided with louvered openings 14 and 15 for ingress and egress of the outdoor cooling air.

Within the lower portion of chamber 10 is a coaxial tube liquid or water chiller 16 having an outer spirally shaped refrigerant carrying tube 17 and an inner spirally shaped water carrying tube 18. A conventional refrigerant circuit 19 respectively serially connects compressor 11, condenser 12, a refrigerant throttling means 20, and the outer tube or evaporator 17 in a closed refrigerant loop.

Disposed within the upper portion of chamber 10 is a gaseous fuel burner 21 supplied with fuel from a gas conduit 22 by way of a solenoid operated valve 23 which is opened upon energization. A continuously operating pilot 24 is connected to conduit 22 upstream of valve 23. Suitable openings 25 in the sides of housing 7 are provided for ingress of combustion air to the second chamber 10. A suitable opening 26 in the top side of housing 7 is provided for egress of flue gas from the second chamber 10. Disposed immediately above and arranged to be heated by burner 21 is a liquid heater 27 comprised of a copper conduit 28 provided with external fins 29 as extended heat transfer surface. A liquid heater inlet conduit 30 communicates the upper end of inner tube 18 with copper conduit 28 for the passage of liquid heat exchange fluid serially through the inner tube 18 of the coaxial tube liquid chiller and the copper conduit 28 of liquid heater 27. The outlet of liquid heater 27 is connected by way of heater outlet conduit 31 to three-way solenoid valve 32. A chiller outlet conduit 33 connects the upper end of inner tube 18 of chiller 16 to three-way valve 32. The outlet of three-way valve 32 connects to a heat exchange liquid supply conduit 34 for supplying liquid heat exchange fluid to heat exchanger 5. Valve 32 has a solenoid operator which actuates valve 32 to communicate conduits 33 and 34 when energized and to communicate conduits 31 and 34 when deenergized. A heat exchange liquid return conduit 35 connects the lower end of heat exchanger 4 with the lower end of inner tube 18 of liquid chiller 16. A pump 36 having an electric motor is disposed within return conduit 35 for circulating liquid heat exchange fluid to and from heat exchanger 4.

Coaxial tube liquid chiller 16 is cast in a body of polyurethane foam 37 for insulating the liquid chiller from other portions of the heating-cooling unit. The upper portion of the second chamber 10 confining burner 21 and liquid heater 27 is lined with a fiberglass insulation 38 having a metallic foil inner liner 39 for purposes of retaining heat within the upper portion of the second chamber 10. A suitable control system 40 responsive to the temperature of the conditioned space 6 is provided for operating the hydronic heating-cooling split system as hereinafter described.

OPERATION

Let it be assumed that gas is supplied to conduit 22 and that pilot 24 is ignited. Upon closure of main switch 41 which connects control system 40 to power source 42, no circuit is energized if the temperature in the conditioned space is at the control point. HOwever, as the temperature falls, thermostat 43 bridges contact 44 to establish a circuit energizing heating relay 45 whereupon contacts 46 and 47 are closed. The closure of contact 46 establishes a first circuit including power source 42, main switch 41, contact 46, and the motor of fan 5 whereby the air within the conditioned space 6 is circulated in heat exchange relationship with heat exchanger 4. The closure of contact 46 also establishes a second circuit including power source 42, main switch 41, contact 46, and the motor of pump 36 whereby the liquid heat exchange fluid is pumped serially through inner tube 18, heater inlet conduit 30, copper conduit 28 of liquid heater 27, heater outlet conduit 31, three-way valve 32, supply conduit 34, heat exchanger 4, to be returned to pump 36 via return conduit 35. The closure of contact 47 of relay 45 establishes a circuit including power source 42, main switch 41, contact 47, and solenoid valve 23 whereby valve 23 is opened to supply fuel gas to burner 21 which is ignited by pilot 24. The liquid passing within the copper conduit 28 acquires heat from burner 21 which is released in heat exchanger 4 to the air within the conditioned space being circulated by fan 5 thereby warming conditioned space 6. When the temperature in the conditioned space again reaches the control point thermostat 43 will break with contact 44 thereby deenergizing relay 45 thus opening contacts 46 and 47. The opening of contacts 46 and 47 interrupts the aforedescribed circuits there deenergizing the motor of fan 5, the motor of pump 36, and the solenoid valve 23 thus shutting off burner 21.

Should the temperature in the conditioned space exceed the control point, thermostat 43 will bridge contact 48 thereby energizing cooling relay 49 to close contacts 50 and 51. The closure of contact 50 establishes a circuit including power source 42, main switch 41, contact 50, and the motor of condenser fan 13 whereby cooling air from the outside is circulated over refrigerant condenser 12. The closure of contact 50 establishes a second circuit including power source 42, main switch 41, contact 50, and the motor of refrigerant compressor 11 whereby refrigerant is caused to circulate within refrigerant circuit 19. The compressed refrigerant gas discharged from refrigerant compressor 11 passes to refrigerant condenser 12 where it is cooled and condensed before passing to a lower pressure via refrigerant throttling means 20 into the outer tube 17 of the coaxial tube liquid chiller 16. The evaporation of refrigerant within tube 17 cools the liquid flowing within inner tube 18. The evaporated refrigerant within tube 17 is again returned to compressor 11. The closure of contact 50 also establishes a third circuit including power source 42, main switch 41, contact 50 and three-way solenoid valve 32. The energization of three-way valve 32 places chiller outlet conduit 33 in direct communication with supply conduit 34. The closure of contact 51 establishes a flat circuit including power source 42, main switch 41, contact 51, and the motor of pump 36 whereby the heat exchange liquid is circulated respectively through the inner tube 18 of coaxial tube liquid chiller 16, chiller outlet conduit 33, three-way solenoid valve 32, supply conduit 34, heat exchanger 4, and return conduit 35 to pump 36 to be recirculated. The closure of contact 51 also establishes a second circuit including power source 42, main switch 41, contact 51 and the motor of fan 5 whereby air within the conditioned space 6 is circulated in heat exchange relationship with heat exchanger 4. Thus heat from the conditioned space is transmitted via heat exchanger 4 to the heat exchange liquid which is then circulated to the coaxial tube liquid chiller 16 where the heat is transferred to inner tube 16 to vaporize the liquid refrigerant therein as hereinbefore described. Should the air within the conditioned space be thus sufficiently cooled to again reach the control point, thermostat 43 will break with contact 48 thereby deenergizing cooling relay 49 thus opening contacts 50 and 51 thereby deenergizing the aforedescribed circuits shutting off condenser fan 13, compressor 11, pump 36, fan 5, and deenergizing three-way solenoid valve 32.

It should be noted that the chilled liquid from inner tube 18 of liquid chiller 16 does not circulate through the liquid heater by reason of the operation of three-way solenoid valve 32. The purpose of this arrangement is to avoid atmospheric condensation on liquid heater 27 which would drip onto burner 21 and cause possible corrosion as well as to avoid unnecessary heat gain as a result of natural convection about conduit 28 and to reduce the flow resistance of the circulating heat exchange liquid during the cooling cycle. However, it should be appreciated that if burner 21 is constructed of a noncorrosive material, or is placed in a position of protection from such condensate, three-way solenoid valve 32 and chiller outlet conduit 33 could be eliminated whereby the circulation of the heat exchange liquid would be serially through inner tube 18, liquid heater inlet conduit 30, liquid heater 27, and through conduits 31 and 34 to heat exchanger 4 under conditions of both heating and cooling.

It should further be appreciated that the refrigeration circuit could be arranged to be reversed during the heating cycle whereby water chiller 16 would become a heat exchange liquid preheater for liquid heater 27.

It should also be appreciated that only the simplest of controls have been shown without conventional time-delay devices and anticipators. If desired, the pump motor may be made to operate continuously.

Having now described the preferred but simplified embodiment of my invention, I contemplate that many changes may be made without departing from the scope or spirit of my invention and I accordingly desire to be limited only by the claims.

I claim:

1. A combined liquid heating and cooling apparatus comprising: a housing; a partition dividing the space within said housing into first and second chambers; a refrigerant compressor within said first chamber; a refrigerant condenser within said first chamber; fan means disposed to pass outdoor cooling air into said first chamber in heat exchange relation with said condenser; a liquid heater disposed within the upper portion of said second chamber; an outer spiral tube disposed within the lower portion of said second chamber; a refrigerant throttling means; a refrigerant circuit respectively serially connecting said refrigerant compressor, said refrigerant condenser, said refrigerant throttling means, and said outer tube in a closed refrigerant loop; an inner tube disposed within said outer tube; and conduit means communicating with said liquid heater and the interior of said inner tube adapted to conduct a heat exchange liquid to and from a heat exchanger external to said housing.

2. The apparatus as defined by claim 1 including a foamed-in-place insulation substantially filling the space between the outer spiral tube and the housing in the lower portion of said second chamber and an insulation liner disposed on the inner walls of the upper portion of said second chamber.

3. A heating and cooling air-conditioning system comprising: an indoor heat exchanger arranged in heat exchange relationship with a conditioned space; combined heating and cooling means for supplying said indoor heat exchanger with a heating and cooling heat exchange liquid; first conduit means for conducting a heat exchange liquid from said heating and cooling means to said indoor heat exchanger; second conduit means for returning the heat exchange liquid to said heating and cooling means from said indoor heat exchanger; said heating and cooling means including a housing defining a chamber therein; a liquid chiller within said chamber; a liquid heater within said chamber; means for conducting the heat exchange liquid from said liquid chiller and heater to said first conduit means; means for conducting the heat exchange liquid from said second conduit means to said liquid chiller and heater; pump means for circulating the heat exchange liquid between said indoor heat exchanger and said combined heating and cooling means; and means for selectively passing said heat exchange fluid selectively through said heater and through said chiller to the exclusion of said heater.

4. A heating and cooling air-conditioning system comprising: an indoor heat exchanger arranged in heat exchange relationship with a conditioned space; combined heating and cooling means for supplying said indoor heat exchanger with a heating and cooling heat exchange liquid; first conduit means for conducting a heat exchange liquid from said heating and cooling means to said indoor heat exchanger; second conduit means for returning the heat exchange liquid to said heating and cooling means from said indoor heat exchanger; said heating and cooling means including a housing defining a chamber therein; a liquid chiller within said chamber; a liquid heater within said chamber; means for conducting the heat exchange liquid from said liquid chiller and heater to said first conduit means; means for conducting the heat exchange liquid from said second conduit means to said liquid chiller and heater; pump means for circulating the heat exchange liquid between said indoor heat exchanger and said combined heating and cooling means; and means responsive to the temperature of said conditioned space for selectively operating said liquid chiller and liquid heater.

* * * * *